UNITED STATES PATENT OFFICE.

PETER FIREMAN, OF TRENTON, NEW JERSEY, ASSIGNOR TO MAGNETIC PIGMENT COMPANY, OF NEW YORK, N. Y., A CORPORATION OF NEW YORK.

UTILIZATION OF SULFURIC-ACID PICKLE LIQUORS.

1,287,939.  Specification of Letters Patent.  Patented Dec. 17, 1918.

No Drawing.  Application filed December 20, 1917.  Serial No. 208,048.

*To all whom it may concern:*

Be it known that I, PETER FIREMAN, a citizen of the United States, residing at Trenton, in the county of Mercer, State of New Jersey, have invented certain new and useful Improvements in the Utilization of Sulfuric-Acid Pickle Liquors; and I do hereby declare the following to be a full, clear, and exact description of the invention, such as will enable others skilled in the art to which it appertains to make and use the same.

In the tinning and galvanizing of wire and plates of iron and steel, sulfuric and hydrochloric acids are used for the removal of the oxids from the metallic surfaces. From this cleaning process there is obtained a waste product known as pickle liquor, which contains, in solution, iron and free acid. In the United States, sulfuric acid is most generally used as the pickling acid and is employed in enormous quantities, while hydrochloric acid is used for the same purpose to a relatively small extent.

The disposal of the sulfuric acid pickle liquor is a problem which constantly confronts the manufacturers of iron and steel wire and plate. For many years, the general practice was to run the pickle liquor into the creeks and rivers, or, simply into the ground, while only limited quantities were worked up into copperas, *i. e.*, iron sulfate in crystalline form. More recently, the authorities have, with increasing strictness, placed under ban the pollution of the streams and the ground with acid liquors. The necessity of finding some lawful method for the disposal of the pickle liquors of the galvanizing and tinning industries has therefore become correspondingly essential, and, in connection therewith, it is likewise desirable to dispose of them in such manner that they will become a source of revenue.

It is the purpose of the present invention to utilize the sulfuric acid pickle liquor, in the art of the manufacture of iron oxid pigments. These sulfuric acid pickle liquors are not well adapted for the direct production of iron oxid pigments (particularly, by means of cheap precipitating agents, such as lime,) for reasons that need not be specifically set forth. On the other hand, the hydrochloric acid solutions of iron are capable of yielding, by simple precipitation processes, as I have discovered, pigments of an extensive variety of colors, to wit,— black, brown, yellow, green and red, each color being obtainable in various shades. These pigments are suitable for use in the paper, rubber, paint and leather industries, and are not obtainable in this variety by direct precipitation from sulfuric pickle liquors.

There is, however, as I have hereinbefore stated, a normal scarcity of hydrochloric acid pickle liquor, owing to the extremely limited use of this acid in the cleaning processes of iron and steel. It has therefore appeared desirable to find a simple and inexpensive way to convert the sulfuric acid pickle liquor into chlorid liquor; thereby extending the field of use of the sulfate liquor and contributing to the relief of the tinning and galvanizing art from a troublesome waste product. I have discovered such a process and will now describe it.

Starting with the sulfuric acid liquor, which is an aqueous solution of iron sulfate and free sulfuric acid, I first neutralize the free acid, which may be effected by scrap iron, lime or the like. After such neutralization, the solution contains only sulfate of iron.

I then treat the solution with calcium chlorid which causes the following reaction:

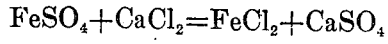
$$FeSO_4 + CaCl_2 = FeCl_2 + CaSO_4$$

A white precipitate of calcium sulfate (gypsum), separates out, while ferrous chlorid is formed and remains in solution. The product is then filtered in order to separate the solution of ferrous chlorid from the gypsum.

The solution of ferrous chlorid thus obtained, is thereupon treated with calcium hydrate, resulting in the following reaction:

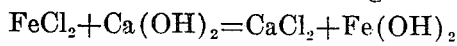
$$FeCl_2 + Ca(OH)_2 = CaCl_2 + Fe(OH)_2$$

It will be noted that the production of the iron hydrate obtained, which is the basis of the pigment manufacture, is accompanied by the production of calcium chlorid as a by-product. The calcium chlorid remains in solution and can then be utilized for the conversion of a subsequent batch of the iron sulfate pickle liquor, producing therefrom, as before, a solution of chlorid of iron together with a precipitate of calcium sulfate.

In this manner, I am enabled to make use of the by-product of the iron oxid manufacture, for the transformation of the sulfate into chlorid, thereby greatly simplifying and cheapening the operation,—the process having all of the advantages of a cyclic operation in which the calcium chlorid originally employed is progressively regenerated for subsequent use. So also, the process has the advantage of producing a pure grade of gypsum easily made available for the market.

In some instances, instead of neutralizing the free acid of the sulfuric acid pickle liquor, in the first step of the process, by means of scrap iron, or the like, I may neutralize the acidity of the liquor in a later step of the process. For instance, I may treat the sulfuric acid pickle liquor with calcium chlorid in accordance with the following equation:—

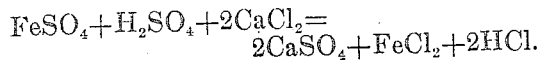
$$FeSO_4 + H_2SO_4 + 2CaCl_2 = 2CaSO_4 + FeCl_2 + 2HCl.$$

It will be noted that the resulting solution still contains free acid,—in this instance, the free acid being hydrochloric acid. In the next and final step of the process, this free hydrochloric acid is neutralized by lime in excess at the same time with the production of the regenerated calcium chlorid and the precipitated ferrous hydrate, in accordance with the following equation, to wit:

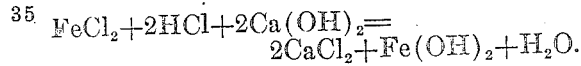
$$FeCl_2 + 2HCl + 2Ca(OH)_2 = 2CaCl_2 + Fe(OH)_2 + H_2O.$$

In other words, whether the free acid present in the sulfuric acid pickle liquor is neutralized preliminarily, or whether the hydrochloric acid produced therefrom is neutralized in a later stage of the process, the net result is nevertheless that eventually any free acid originally present in the sulfuric acid pickle liquor or produced therefrom during the process is eventually neutralized in one of the steps of the operation.

It will, of course, be understood that instead of calcium chlorid I may use barium chlorid throughout the process, in which event barium oxid would be used in place of lime. I prefer the use of calcium chlorid and lime, however, because they are much cheaper.

Having thus described my invention, what I claim is:

1. The method of utilizing sulfuric acid pickle liquor, which comprises converting the sulfate of iron of the liquor into ferrous chlorid by means of an alkaline earth chlorid and with the production of a precipitate of an alkaline earth sulfate, and treating the ferrous chlorid with an alkaline earth oxid thereby regenerating the alkaline earth chlorid and obtaining a precipitate of ferrous hydrate, any free acid being eventually neutralized in one of the steps of the process; substantially as described.

2. The method of utilizing sulfuric acid pickle liquor, which comprises neutralizing the free sulfuric acid contained therein, treating the resultant sulfate of iron solution with an alkaline earth chlorid and thereby producing a solution of ferrous chlorid and a precipitate of an alkaline earth sulfate, and treating the ferrous chlorid solution with an alkaline earth oxid, thereby regenerating the alkaline earth chlorid and obtaining a precipitate of ferrous hydrate; substantially as described.

3. The method of utilizing sulfuric acid pickle liquor, which comprises converting the sulfate of iron of the liquor into ferrous chlorid by means of calcium chlorid and with the production of a precipitate of calcium sulfate, and treating the ferrous chlorid with lime thereby regenerating the calcium chlorid and obtaining a precipitate of ferrous hydrate, any free acid being eventually neutralized in one of the steps of the process; substantially as described.

4. The method of utilizing sulfuric acid pickle liquor, which comprises neutralizing the free sulfuric acid contained therein, treating the resultant sulfate of iron solution with calcium chlorid and thereby producing a solution of ferrous chlorid and a precipitate of calcium sulfate, and treating the ferrous chlorid solution with calcium hydrate, thereby regenerating the calcium chlorid and obtaining a precipitate of ferrous hydrate; substantially as described.

In testimony whereof I affix my signature.

PETER FIREMAN.